(12) United States Patent
Tseng

(10) Patent No.: US 8,130,723 B2
(45) Date of Patent: Mar. 6, 2012

(54) METHOD AND APPARATUS FOR IMPROVING REORDERING FUNCTIONALITY IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 931 days.

(21) Appl. No.: 12/105,287

(22) Filed: Apr. 18, 2008

(65) Prior Publication Data
US 2008/0259832 A1 Oct. 23, 2008

Related U.S. Application Data

(60) Provisional application No. 60/912,919, filed on Apr. 19, 2007, provisional application No. 60/942,450, filed on Jun. 6, 2007, provisional application No. 60/945,947, filed on Jun. 25, 2007.

(51) Int. Cl.
*H04L 12/56* (2006.01)
*H04Q 7/20* (2006.01)

(52) U.S. Cl. ........ 370/331; 370/242; 370/329; 370/336; 370/442; 455/436; 455/450; 455/452.2

(58) Field of Classification Search .......... 370/200–503; 375/340–342; 455/434–452.2, 456.2, 422.1
See application file for complete search history.

(56) References Cited

U.S. PATENT DOCUMENTS

| | | | |
|---|---|---|---|
| 2003/0092458 A1 | 5/2003 | Kuo | |
| 2003/0206534 A1 | 11/2003 | Wu | |
| 2005/0270996 A1 | 12/2005 | Yi | |
| 2008/0225765 A1* | 9/2008 | Marinier et al. | 370/310 |

FOREIGN PATENT DOCUMENTS

| | | |
|---|---|---|
| JP | 2007533280 A | 11/2007 |
| KR | 20020013840 A | 2/2002 |
| KR | 1020050016020 A | 2/2005 |
| WO | 2005117317 A1 | 12/2005 |

OTHER PUBLICATIONS

3GPP: "3GPP TS 25.321, Technical Specification Group Radio Access Network; Medium Access Control (MAC) protocol specification", Release 7, 3GPP TS 25.321 V7.8.0 (Mar. 2008), pp. 96-103, XP050367713.
3GPP TS 25.322 V7.2.0 (Sep. 2006), "Radio Link Control (RLC) protocol specification (Release 7)".
3GPP TSG-RAN WG2#58bis "Summary of email discussion on reordering issue in Enhanced Cell_Fach", Jun. 2007.
R2-072029 3GPP TSG-RAN WG2 Meeting #58, "Initiation of state variable VR(UDH) and VR(UDR)", May 2007.
R2-072197 3GPP TSG-RAN WG2 Meeting #57bis, "Solution to reordering issue in Enhanced Cell_FACH", May 2007.

(Continued)

*Primary Examiner* — Afsar M. Qureshi
(74) *Attorney, Agent, or Firm* — Klein, O'Neill & Singh, LLP

(57) ABSTRACT

A method for improving a reordering functionality in a wireless communications system comprises configuring a reset timer, utilized for controlling the reset of a reordering functionality of a protocol entity, reassembling all received protocol data units in the protocol entity with previously stored protocol data unit segments, and discarding all protocol data unit segments that cannot be reassembled in the protocol entity.

24 Claims, 8 Drawing Sheets

OTHER PUBLICATIONS

R2-072374 3GPP TSG-RAN WG2 Meeting #58bis, "Summary of email discussion on reordering issue in Enhanced Cell_Fach", Jun. 2007.
R2-072534 3GPP TSG-RAN WG2 Meeting #58bis, "Reordering for common H-RNTI ", Jun. 2007.
NOKIA; NOKIA SIEMENS NETWORKS: "MAC-ehs queue reset", 3GPP draft TSG-RAN-WG2 Meeting #58bis, R2-072686, Jun. 25-29, 2007, pp. 1-3, XP050135477.
3GPP: "3GPP TS 25.321 V5.13.0, Technical Specification Group Radio Access Network ; Medium Access Control (MAC) protocol specification (Release 5)", pp. 49-54, XP002546676, Mar. 2007.
3GPP: "3GPP TS 25.308 V7.2.0; Technical Specification Group Radio Access Network; High Speed Downlink Packet Access (HSDPA); Overall description", pp. 20-21, XP002546677, Mar. 2007.

* cited by examiner

| Timing point | SN | 1 | 2 | 3 | 4 | 5 | 6 | ... | R-next_expected_TSN | H-RcvWindow_UpperEdge | T-T1_TSN |
|---|---|---|---|---|---|---|---|---|---|---|---|
| TP1 | | *R | x | x | x | x | 6HT | * | | | |
| TP2 | | *R | x | x | 4 | x | 6HT | * | | | |
| TP3 | | * | R | x | 4 | 5 | 6T 7H | * | | Timer T1 starts | |
| TP4 | | *2R | x | x | 4 | 5 | 6T 7H | * | | | |
| TP5 | | * | x | R | 4 | 5 | 6T 7H | * | | | |
| TP6 | | * | x | x | x | x | T H | * R | | Timer T1 expires | Deliver 2 |
| | | * | x | x | x | x | 8HTR | * | | | Deliver 4,5,6,7 |
| | | * | x | x | x | x | HT | * R | | Timer T1 starts | Deliver 8 |
| | | | | | | | | | ... | Timer T1 stops | |
| TP7 | | * | x | x | x | 5 | x H | * R | | | Discard 5 |
| TP8 | | * | x | x | 6 | 7 | H | * R | | | Discard 6,7 |
| TP9 | | * | x | x | x | x | 8H | * R | | | Discard 8 |

FIG. 1 PRIOR ART

METHOD AND APPARATUS FOR IMPROVING REORDERING FUNCTIONALITY IN A WIRELESS COMMUNICATIONS SYSTEM

CROSS REFERENCE TO RELATED APPLICATIONS

This application claims the benefit of U.S. Provisional Application No. 60/945,947, filed on 2007 Jun. 25 and entitled "Method and Apparatus for Implying the Completeness of a Message by Setting Sequence Number and Reordering in HARQ with Common H-RNTI", the benefit of U.S. Provisional Application No. 60/912,919, filed on 2007 Apr. 19 and entitled "Method and Apparatus for Handling Data Packet in UM", and the benefit of U.S. Provisional Application No. 60/942,450, filed on 2007 Jun. 6 and entitled "Method and Apparatus for Improving Reordering of HS-DSCH in CELL_FACH", the contents of which are incorporated herein by reference.

BACKGROUND OF THE INVENTION

1. Field of the Invention

The present invention relates to a method and apparatus for improving a reordering functionality in a wireless communications system, and more particularly, to a method and apparatus for improving a reordering functionality of a high-speed downlink reception operation in a CELL_FACH state of a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

In the prior art, lengths of all Protocol Data Units (PDUs) outputted from a Radio Link Control (RLC) layer are the same. However, such doings decreases bandwidth utility rate and data processing efficiency, especially for high data rate applications, such as High Speed Downlink Package Access (HSDPA) and High Speed Uplink Package Access (HSUPA) in the 3G mobile telecommunications system. Thus, targeting at high data rate applications, the 3rd Generation Partnership Project (3GPP) makes some modifications for RLC and Media Access Control (MAC) layers, which primarily includes adopting variable RLC PDU sizes and providing PDU segmentation in the MAC layer, to enhance bandwidth utility rate and data processing efficiency, thereby making high data rate induced by physical layer technologies such as Multi-input Multi-output (MIMO) and high order modulations become possible.

In such a situation, the 3GPP newly introduces a MAC-ehs protocol entity in the MAC layer to support segmentation, reordering and reassembly of RLC PDUs with variable lengths. In addition, the MAC-ehs protocol entity can further multiplex data of various priority queues to a MAC-ehs PDU in a Transmission Time Interval (TTI) for enhancing the flexibility of data scheduling. Detailed operations of the MAC-ehs entity can be found in the MAC protocol specification made by the 3GPP, and are not narrated herein.

Besides, on the basis of HSDPA, the 3GPP further introduces HS-DSCH reception in a CELL_FACH state allowing a user equipment (UE) in the CELL_FACH state to monitor a High Speed Downlink Shared Channel (HS-DSCH) accompanied with a Shared Control Channel for HS-DSCH (HS-SCCH) for downlink data reception, so as to improve a peak data rate, a signaling delay, a state transition delay, download times and flexible cell capacity.

According to the MAC protocol specification made by the 3GPP, when the UE initiates the HS-DSCH reception in the CELL_FACH state, the network cannot positively acknowledge whether packets it has transmitted are successfully received. To increase a probability that the UE successfully receives packets, the network can utilize a periodic retransmission mechanism of a scheduling algorithm to periodically retransmit packets that it has already transmitted. In this case, the UE needs to handle and reorder these packets for being delivered to an upper protocol layer in order.

Thus, in order to make the UE correctly process the service content, a reordering functionality of the above MAC-ehs entity needs to execute PDU discarding, reordering and delivering operations according to Sequence Numbers (SNs) of the received PDUs, so that the PDUs that may be transmitted from different sources (cells) and/or retransmitted from a same source can be combined to form a PDU sequence with a correct order and delivered to the upper layer efficiently, which further avoids data delay and errors. As for the detailed operations of the reordering functionality, please refer to the following descriptions.

First, state variables, timers and protocol parameters below are defined by the specification of the communications protocol described above:

1. Variable next_expected_TSN:
represents an SN of a next PDU that is expected to be received by the reordering functionality, of which the initial value is 0.

2. Variable RcvWindow_UpperEdge:
represents an SN corresponding to a upper edge of a receiver window in the reordering functionality, of which the value equals to a highest SN of all received PDUs and the initial value is set to 63.

3. Timer T1:
represents a time to deliver PDUs that are not received in order by the receiver window for avoiding delivery stall of the received PDU.

4. Variable T1_TSN:
represents an SN of a PDU that is not received in order by the receiver window to trigger the timer T1.

5. Parameter Receiver_Window_Size:
represents a size of the receiver window in the reordering functionality, of which the value is configured by upper layers.

Thus, when the receiver window is not advanced, a receivable range of the receiver window is from (RcvWindow_UpperEdge−Receiver_Window_Size+1) to RcvWindow_UpperEdge. After the UE initiates the HS-DSCH reception in the CELL_FACH state, if an SN of a received PDU conforms to the variable next_expected_TSN, the PDU shall be delivered to a upper layer reassembly entity, and the value of the variable next_expected_TSN is added by 1. If an SN of a received PDU lies in the receiver window and smaller than the variable next_expected_TSN, the PDU shall be discarded. Conversely, if an SN of a received PDU lies in the receiver window but greater than the variable next_expected_TSN, the PDU shall be stored in a buffer by the reordering functionality. On the other hand, if an SN of a received PDU lies outside the receiver window, the variable RcvWindow_UpperEdge is set to be the SN of the received PDU so as to advance the receiver window, and the variable next_expected_TSN is set to be (RcvWindow_UpperEdge−Receiver_Window_Size+1) if smaller than (RcvWindow_UpperEdge−Receiver_Window_Size+1).

The operations of the timer T1 are illustrated in the following. If a PDU with an SN greater than the variable next_expected_TSN is received and the timer T1 is not activated yet, the timer T1 shall be started and the variable T1_TSN is set to be the SN of the received PDU. Before expiry of the timer T1, if a received PDU with an SN equal to the variable T1_TSN can be delivered, such as the variable next_expected_TSN is advanced to the SN equal to the variable T1_TSN, the timer T1 shall be stopped. On the other hand, when the timer T1 expires and the variable next_expected_TSN is not yet advanced to the SN equal to the variable T1_TSN, all received PDUs with SNs smaller than the variable T1_TSN and all received PDUs with consecutive SNs smaller than that of a next not received PDU shall be delivered to a upper layer reassembly entity for being reassembled, and the variable next_expected_TSN shall be set to the SN of the next not received PDU. When the timer T1 is stopped or expires, if there still exist received PDUs that cannot be delivered to the reassembly entity in the receiver window, the variable T1_TSN is set to be a highest SN among those of the received PDUs that cannot be delivered, and the timer T1 is restarted.

In other words, after starting the timer T1, if the received PDU with the SN equal to the variable T1_TSN cannot be delivered until the expiry of the timer T1, PDUs with SNs smaller than the variable T1_TSN that have not been successfully received are then considered to be lost, and the received PDUs with the SNs smaller than that of the next not received PDU are all delivered to the upper layer for being reassembled, so as to prevent data delay of the UE. In this situation, the SN of the next PDU that is expected to be received by the reordering functionality (i.e. the variable next_expected_TSN) is then turned to be a smallest SN among those of PDUs that are not successively received or delivered. If there still exist received PDUs that cannot be delivered to the reassembly entity in the receiver window, the operations shall be repeated until the PDU with the SN equal to the variable RcvWindow_UpperEdge is delivered and the variable next_expected_TSN is then advanced to a next SN of the variable RcvWindow_UpperEdge.

As mentioned above, in normally situations such as the reordering functionality is initiated, the PDUs can be received in order or the PDUs are delivered out of order due to expiry of the timer T1, the variable next_expected_TSN is greater than the variable RcvWindow_UpperEdge by 1 (with modulus operations). In this case, if no PDU is received for a period of time (e.g. longer than expiry time of the timer T1), such as the UE temporarily moves out coverage of all serving cells, when the UE moves back in the coverage of the serving cells and receives PDUs with SNs lying in the receiver window, the received PDUs will be discarded unnecessarily according to the above specification, so that data error of the UE may occur.

For example, please refer to FIG. 1. FIG. 1 is a diagram representing variables and SNs of received PDUs in a reordering functionality. Supposing that the parameter Receiver_Window_Size is set to be 6, the range between (*) represents a receiver window, R represents the variable next_expected_TSN, x represents a PDU that is not received or is already delivered in the receiver window, H represents the variable RcvWindow_UpperEdge, and T represents the variable T1_TSN. Firstly, a PDU with SN=6 is received at a timing point TP1, and thus the variable RcvWindow_UpperEdge is set to be 6 for advancing the receiver window and the variable next_expected_TSN is set to a smallest SN of the receiver window. Since no timer T1 is activated and the SN of the received PDU is greater than the variable next_expected_TSN, the timer T1 shall be started and the variable T1_TSN is set to be 6. Next, a PDU with SN=4 is received at a timing point TP2, and since the SN of the received PDU lies in the receiver window and is greater than the variable next_expected_TSN, the received PDU is stored in a buffer by the reordering functionality. When PDUs with SNs=5, 6 and 7 are received simultaneously at a timing point TP3, since the PDU with SN=7 lies outside the receiver window, the reordering functionality not only stores the PDUs with SNs=5,6 but also sets the variable RcvWindow_UpperEdge and the variable next_expected_TSN to be 7 and 2, respectively, so as to advance the receiver window. After that, a PDU with SN=2 is received at a timing point TP4, and since the SN conforms to the variable next_expected_TSN, the received PDU is delivered to the reassembly entity and the variable next_expected_TSN is advanced forward to a next SN.

Supposing that the timer T1 expires at a timing point TP5, since the variable T1_TSN is still greater than the variable next_expected_TSN, all received PDUs with SNs smaller than the variable T1_TSN and that of the next not received PDU (i.e. SN=8) are delivered, and the variable next_expected_TSN is set to the SN of the next not received PDU. In this situation, if subsequent PDUs can be received in order, the reordering functionality also advances the receiver window and delivers the received PDUs in order. For example, when a PDU with SN=8 is received at a timing point TP6, the timer T1 is started and the variable T1_TSN is set to be 8. However, since the variable next_expected_TSN is also equal to 8, the PDU with SN=8 is then delivered to the upper layer and the timer T1 is stopped immediately.

Please further refer to FIG. 1. Supposing that no PDU is received for a period of time after the timing point TP6 (e.g. longer than expiry time of the timer T1), if a PDU with an SN lying inside the receiver window is then received at a timing point TP7, such as the PDU with SN=5, the received PDU shall be discarded according to the above specification, no matter whether the received PDUs are lately transmitted from the network, which may cause data error of the UE. Timing points TP8 and TP9 also exist the same problems.

Therefore, in order to solve the said problem, the 3GPP newly introduces a reset timer Treset in the reordering functionality, which is used for resetting the receiver window when the timer T1 expires, so as to avoid a situation that received PDUs are discarded incorrectly. According to the newly formulated MAC protocol, when the UE initiates the HS-DSCH reception in the CELL_FACH state, if a PDU is correctly received and no reset timer Treset is activated, the reset timer Treset shall be started. Conversely, if a PDU is correctly received and the reset timer Treset is already activated, the reset timer Treset shall be restarted. On the other hand, when the reset timer Treset expires, the variable next_expected_TSN and the variable RcvWindow_UpperEdge shall be reset to their initial values.

That means, when no PDU is received for a period of time, causing expiry of the reset timer Treset, the receiver window of the reordering functionality shall be reset to prevent received PDUs from being discarded incorrectly. However, in the prior art, stored PDU segments in the upper layer reassembly entity are not discarded when the reset of the receiver window is performed. In this situation, subsequently received PDUs may be wrongly concatenated with the stored PDU segments, resulting in data error of the UE. On the other hand, the increase of the new reset timer Treset may add system complexity of the UE, which further consumes limited operating resources of the UE.

Besides, when the receiver window of the reordering functionality is reset or initiated, such as when the reset timer Treset expires or required by upper layers, the variable next_expected_TSN and the variable RcvWindow_UpperEdge are set to be 0 and 63, respectively. In this situation, if PDUs with SNs lying in the receiver window is received (e.g. a PDU with SN=62) after the receiver window of the reordering functionality is reset or initiated, the received PDUs would be discarded incorrectly, which may also cause data error of the UE.

SUMMARY OF THE INVENTION

It is therefore an objective of the present invention to provide a method and apparatus for improving a reordering functionality in a wireless communications system.

According to the present invention, a method for improving a reordering functionality in a user equipment of a wireless communications system is disclosed. The method includes steps of configuring a reset timer, the reset timer controlling a reset of a reordering functionality in a protocol entity; reassembling all received protocol data units with previously stored protocol data unit segments in the protocol entity when the reset of the reordering functionality is required by expiry of the reset timer; and discarding all protocol data unit segments stored in the protocol entity.

According to the present invention, a communications device for improving a reordering functionality in a wireless communications system is further disclosed. The communications device includes a control circuit for realizing functions of the communications device; a processor installed in the control circuit, for executing a program code to command the control circuit; and a memory installed in the control circuit and coupled to the processor for storing the program code. The program code includes steps of configuring a reset timer, the reset timer controlling a reset of a reordering functionality in a protocol entity; reassembling all received protocol data units with previously stored protocol data unit segments in the protocol entity when the reset of the reordering functionality is required by expiry of the reset timer; and discarding all protocol data unit segments stored in the protocol entity.

According to the present invention, a method for improving a reordering functionality in a user equipment of a wireless communications system is further disclosed. The method includes steps of configuring a first timer, the first timer controlling a receiver window of a reordering functionality to release received protocol data units; activating the first timer when the user equipment conforms to a default situation; and restarting the first timer and resetting the receiver window according to a transmission sequence number of a protocol data unit if the protocol data unit is received by the reordering functionality when the first timer expires and there is no received protocol data unit in the receiver window.

According to the present invention, a communications device for improving a reordering functionality in a wireless communications system is further disclosed. The communications device includes a control circuit for realizing functions of the communications device; a processor installed in the control circuit, for executing a program code to command the control circuit; and a memory installed in the control circuit and coupled to the processor for storing the program code. The program code includes steps of configuring a first timer, the first timer controlling a receiver window of a reordering functionality to release received protocol data units; activating the first timer when the user equipment conforms to a default situation; and restarting the first timer and resetting the receiver window according to a transmission sequence number of a protocol data unit if the protocol data unit is received by the reordering functionality when the first timer expires and there is no received protocol data unit in the receiver window.

According to the present invention, a method for improving a reordering functionality in a user equipment of a wireless communications system is further disclosed. The method includes steps of configuring a first timer, the first timer controlling a receiver window of a reordering functionality to release received protocol data units; activating a second timer when a next expected transmission sequence number of the receiver window is a transmission sequence number next to an upper edge of the receiver window; and restarting the first timer and resetting the receiver window according to a transmission sequence number of a protocol data unit if the protocol data unit is received by the reordering functionality after the second timer expires.

According to the present invention, a communications device for improving a reordering functionality in a wireless communications system is further disclosed. The communications device includes a control circuit for realizing functions of the communications device; a processor installed in the control circuit, for executing a program code to command the control circuit; and a memory installed in the control circuit and coupled to the processor for storing the program code. The program code includes steps of configuring a first timer, the first timer controlling a receiver window of a reordering functionality to release received protocol data units; activating a second timer when a next expected transmission sequence number of the receiver window is a transmission sequence number next to an upper edge of the receiver window; and restarting the first timer and resetting the receiver window according to a transmission sequence number of a protocol data unit if the protocol data unit is received by the reordering functionality after the second timer expires.

According to the present invention, a method for improving a reordering functionality in a user equipment of a wireless communications system is further disclosed. The method includes steps of stopping use of a transmission sequence number series, the transmission sequence number series comprising a plurality of successive transmission sequence numbers; and allocating a plurality of transmission sequence numbers in a same side of the transmission sequence number series to a plurality of protocol data units of a same user data.

According to the present invention, a communications device for improving a reordering functionality in a wireless communications system is further disclosed. The communications device includes a control circuit for realizing functions of the communications device; a processor installed in the control circuit, for executing a program code to command the control circuit; and a memory installed in the control circuit and coupled to the processor for storing the program code. The program code includes steps of stopping use of a transmission sequence number series, the transmission sequence number series comprising a plurality of successive transmission sequence numbers; and allocating a plurality of transmission sequence numbers in a same side of the transmission sequence number series to a plurality of protocol data units of a same user data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram representing variables and SNs of received PDUs in a reordering functionality.

DETAILED DESCRIPTION

Figure 2:
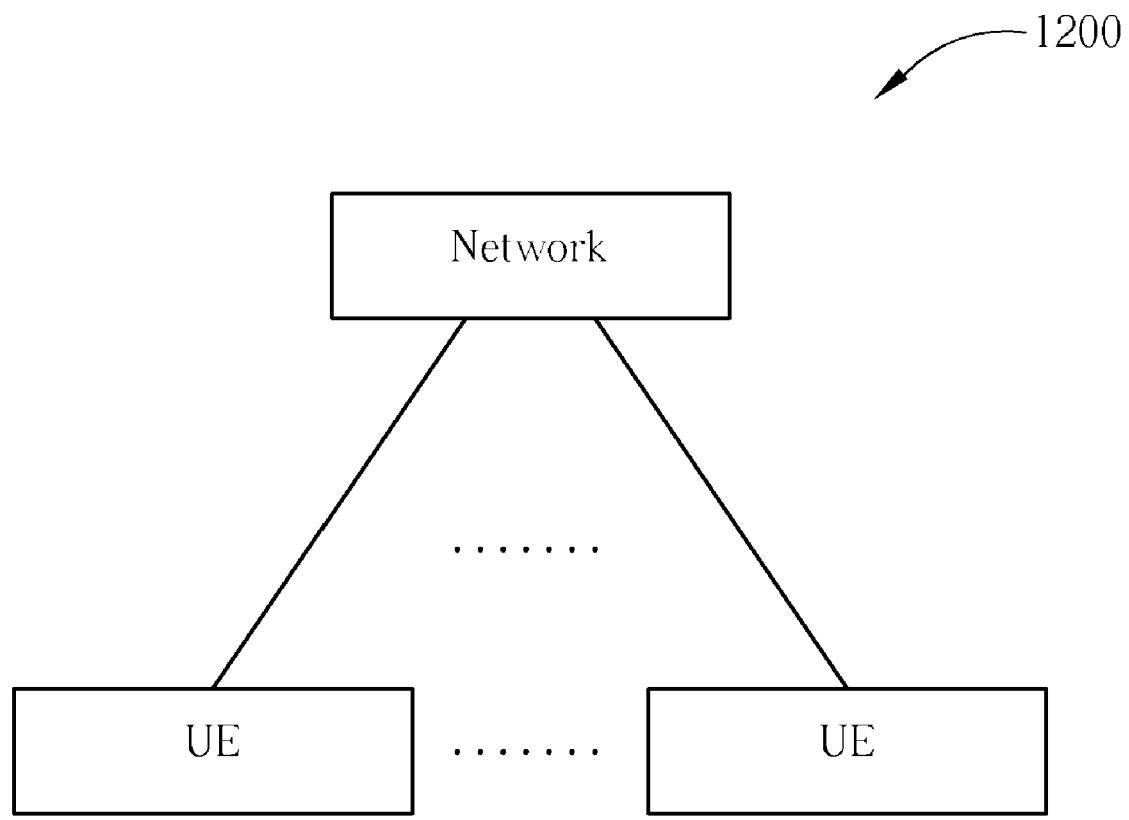
FIG. 2 is a diagram of a wireless communications system.

Please refer to FIG. 2, which illustrates a schematic diagram of a wireless communications system 1200. The wireless communications system 1200 is preferably a high speed packet access (HSPA) system of a third generation (3G) mobile telecommunications system, and is briefly composed of a network and a plurality of UEs. In FIG. 2, the network and the UEs are simply utilized for illustrating the structure of the wireless communications system 1200. Practically, the network terminal may comprise a plurality of base stations (or Node B), radio network controllers and so on according to actual demands, and the UEs can be devices such as mobile phones, computer systems, etc.

Figure 3:
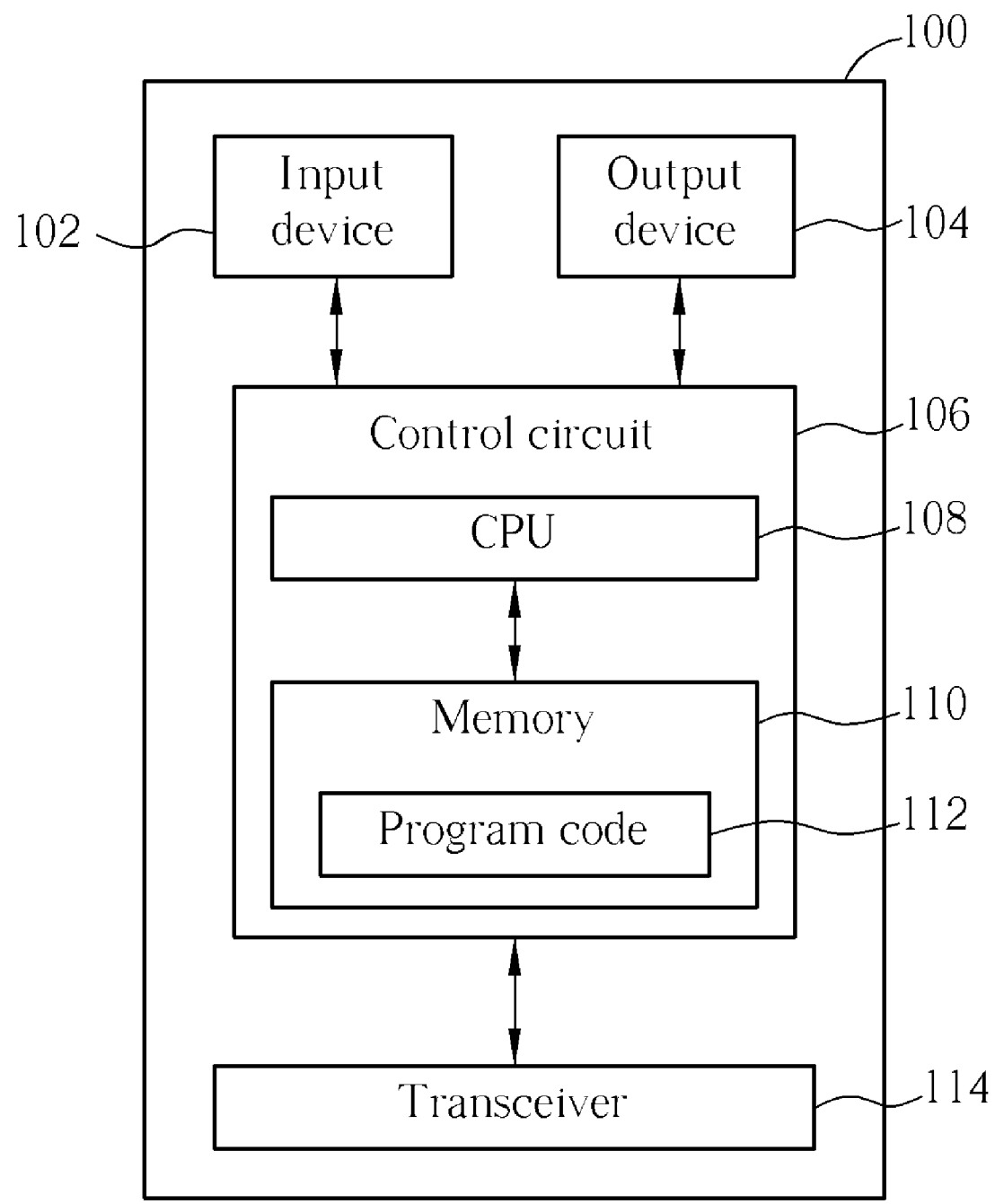
FIG. 3 is a functional block diagram of a communications device.

Please refer to FIG. 3, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
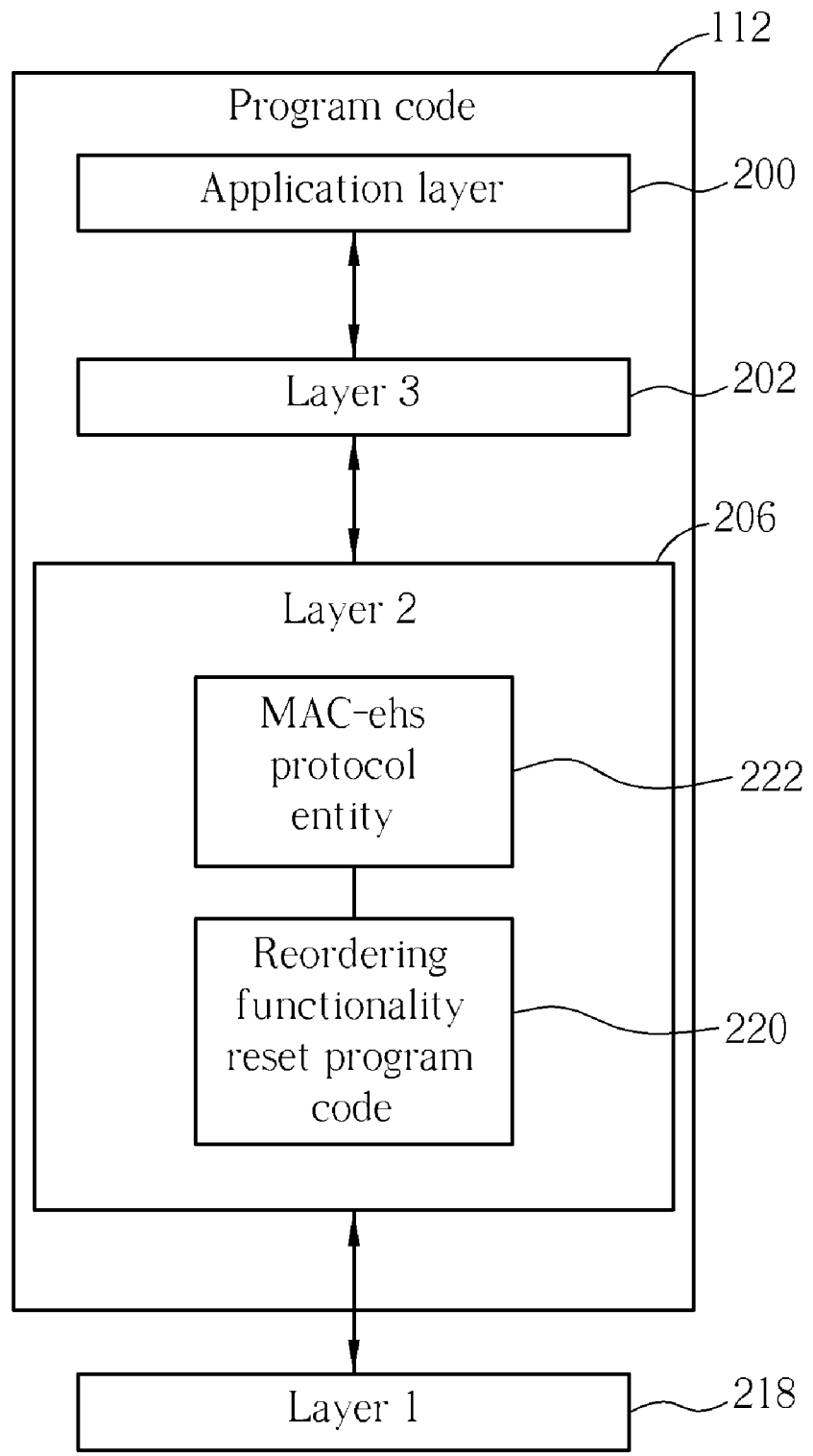
FIG. 4 is a diagram of the program code shown in FIG. 3.

Please continue to refer to FIG. 4. FIG. 4 is a diagram of the program code 112 shown in FIG. 3. The program code 112 includes an application layer 200, a Layer 3 202, and a Layer 2 206, and is coupled to a Layer 1 218. The Layer 2 206 includes a MAC-ehs protocol entity 222 utilized for providing an HS-DSCH reception function in a CELL_FACH state. In this situation, a reordering functionality of the MAC-ehs protocol entity 222 needs to execute discarding, reordering and delivering operations for received protocol data units (PDUs) according to Sequence Numbers (SNs) of the received PDUs, so that the PDUs that may be transmitted from different sources (cells) and/or retransmitted from a same source can be combined to form a PDU sequence with a correct order and delivered to the upper layer efficiently, which further avoids data delay and errors.

Figure 5:
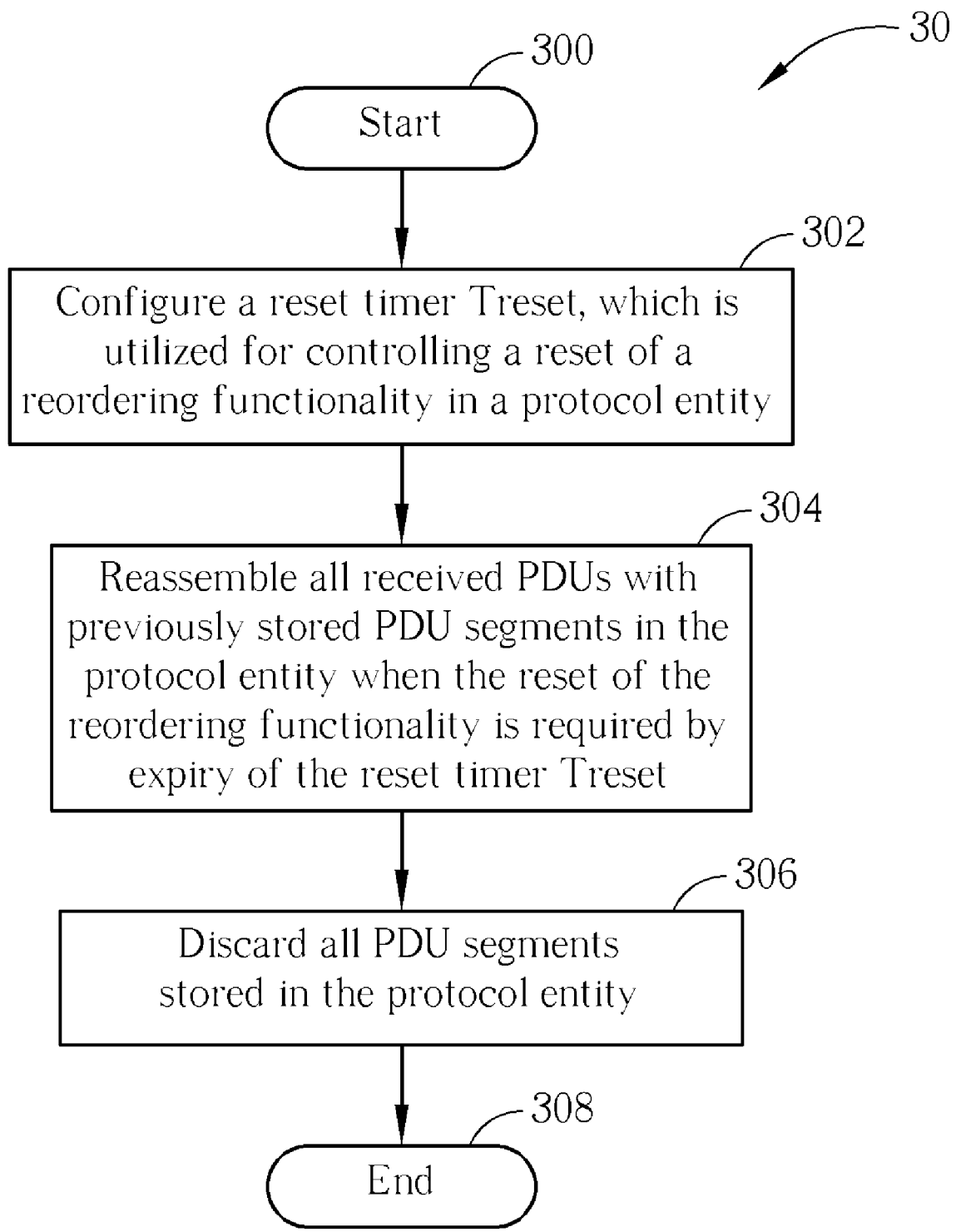
FIG. 5 is a flow chart of a process according to a first embodiment of the present invention.

When the communications device 100 initiates the HS-DSCH reception function in CELL_FACH state, if no PDU is received for a period of time, a receiver window of the reordering functionality has to be reset for avoiding a situation that received PDUs are discarded incorrectly. In this case, the embodiment of the present provides a reordering functionality reset program code 220 in the program code 112 to correctly execute the reset of the reordering functionality. Please refer to FIG. 5, which illustrates a schematic diagram of a process 30 according to a first embodiment of the present invention. The process 30 is utilized for improving a reordering functionality in a user equipment of a wireless communications system, and can be compiled into the reordering functionality reset program code 220. The process 30 includes the following steps:

Step 300: Start.

Step 302: Configure a reset timer Treset, which is utilized for controlling a reset of a reordering functionality in a protocol entity.

Step 304: Reassemble all received PDUs with previously stored PDU segments in the protocol entity when the reset of the reordering functionality is required by expiry of the reset timer Treset.

Step 306: Discard all PDU segments stored in the protocol entity.

Step 308: End.

According to the process 30, the reset timer Treset is firstly configured, which is utilized for resetting a receiver window of the reordering functionality to prevent received PDUs from being discarded incorrectly. When the reset of the reordering functionality is required by expiry of the reset timer Treset, the embodiment of the present invention reassembles all received PDUs with previously stored PDU segments in the protocol entity and discards all PDU segments not being reassembled in the protocol entity.

Preferably, reassembling the received PDUs with the previously stored PDU segments in the protocol entity further includes delivering complete upper layer PDUs of the received PDUs to an upper layer protocol entity of the protocol entity. Certainly, the embodiment of the present invention can also deliver complete upper layer PDUs being successfully reassembled to an upper layer protocol entity of the protocol entity.

Therefore, when the reset of the reordering functionality is required by expiry of the reset timer Treset, since all received PDUs are reassembled with previously stored PDU segments and the PDU segments not being reassembled are further discarded in the protocol entity, the embodiment of the present invention can prevent subsequently received PDUs from being concatenated with the stored PDU segments in the reassembly entity, so as not to cause data error of the UE.

On the other hand, since a related algorithm of the newly introduced reset timer Treset increases complexity of the wireless communications system, the embodiment of the present further provides a reordering functionality reset program code 220 in the program code 112, used for resetting a receiver window of a reordering functionality when no PDU is received for a period of time, so as to avoid a situation that received PDUs are wrongly discarded. Please refer to FIG. 6, which illustrates a schematic diagram of a process 40 according to a second embodiment of the present invention. The process 40 is utilized for improving a reordering functionality in a user equipment of a wireless communications system, and can be compiled into the reordering functionality reset program code 220. The process 40 includes the following steps:

Step 400: Start.

Step 402: Configure a first timer T1, which is utilized for controlling a receiver window of a reordering functionality to release received PDUs.

Step 404: Activate the first timer T1 when the UE conforms to a default situation.

Step 406: Restart the first timer T1 and reset the receiver window according to a sequence number (SN) of a PDU if the PDU is received by the reordering functionality when the first timer T1 expires and there is no received PDU in the receiver window.

Step 408: End.

According to the process 40, the first timer T1, utilized for controlling a receiver window of a reordering functionality to release received PDUs, is configured for avoiding delivery stall of the received PDU. If the UE conform to a default situation, the first timer T1 is activated. The default situation is when a first PDU with an SN greater than a next expected SN of the receiver window is received by the reordering functionality and the first timer T1 is not yet activated, or when the next expected SN of the receiver window is an SN next to an upper edge of the receiver window. When the first timer T1 expires and there is no received PDU in the receiver window, if a PDU is received by the reordering functionality, the first timer T1 is restarted and the receiver window is reset according to an SN of the received PDU.

Compared with the prior art, the timer T1 in the embodiment of the present invention is further activated when the next expected SN of the receiver window is an SN next to an upper edge of the receiver window. In this situation, when the first timer T1 expires and there exists no received PDU in the receiver window, if a PDU is received, the received PDU is then considered as a firstly received PDU for resetting the receiver window of the reordering functionality, and the first timer T1 is restarted.

In other words, the timer T1 is reused for controlling the reset of the receiver window according to the SN of the received PDU when the next expected SN of the receiver window is an SN next to the upper edge of the receiver window and no PDU is received for a period of time, so as to prevent the received PDUs from being discarded incorrectly. Therefore, in the embodiment of the present invention, system complexity can be reduced significantly since the above reset timer Treset is not needed anymore in the wireless communications system.

Certainly, the embodiment of the present invention further includes steps of stopping the first timer T1 when the first PDU is delivered to the upper layer, restarting the first timer T1 when the first timer T1 is stopped and there still exist received PDUs in the receiver window, and delivering received PDUs with SNs lower than that of the first PDU or that of a next not-received PDU in the receiver window to an upper layer and setting the next expected SN of the receiver window to be an SN of the next not-received PDU when the first timer T1 expires and there still exist received PDUs in the receiver window. The related operations are similar to that of the timer T1 in the prior art, and thus not narrated again herein.

Preferably, resetting the receiver window of the reordering functionality according to the SN of the received PDU includes setting an upper edge of the receiver window to be the SN of the received PDU and setting the next expected SN of the receiver window to be a lower edge of the receiver window.

Figure 6:
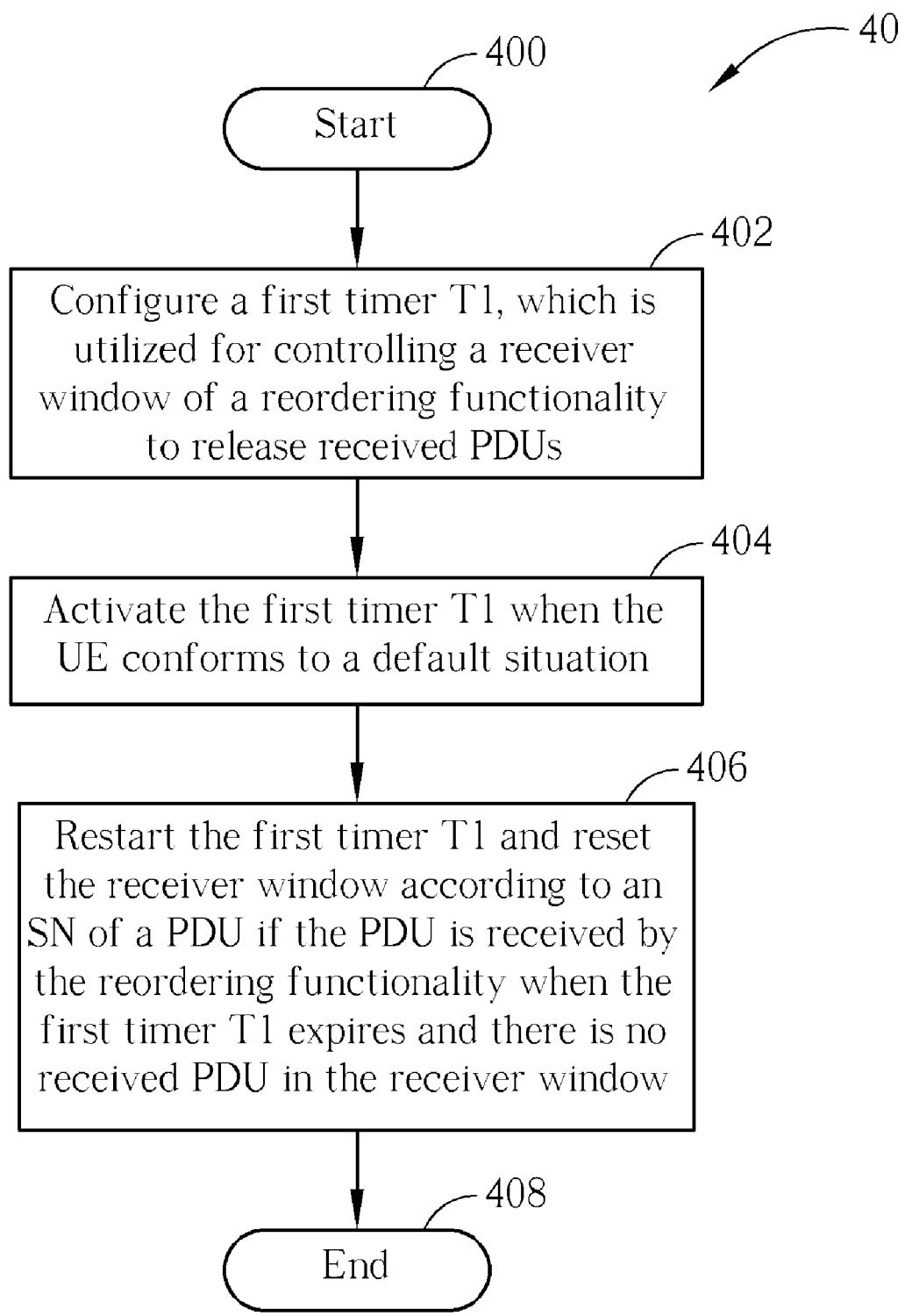
FIG. 6 is a flow chart of a process according to a second embodiment of the present invention.
Figure 7:
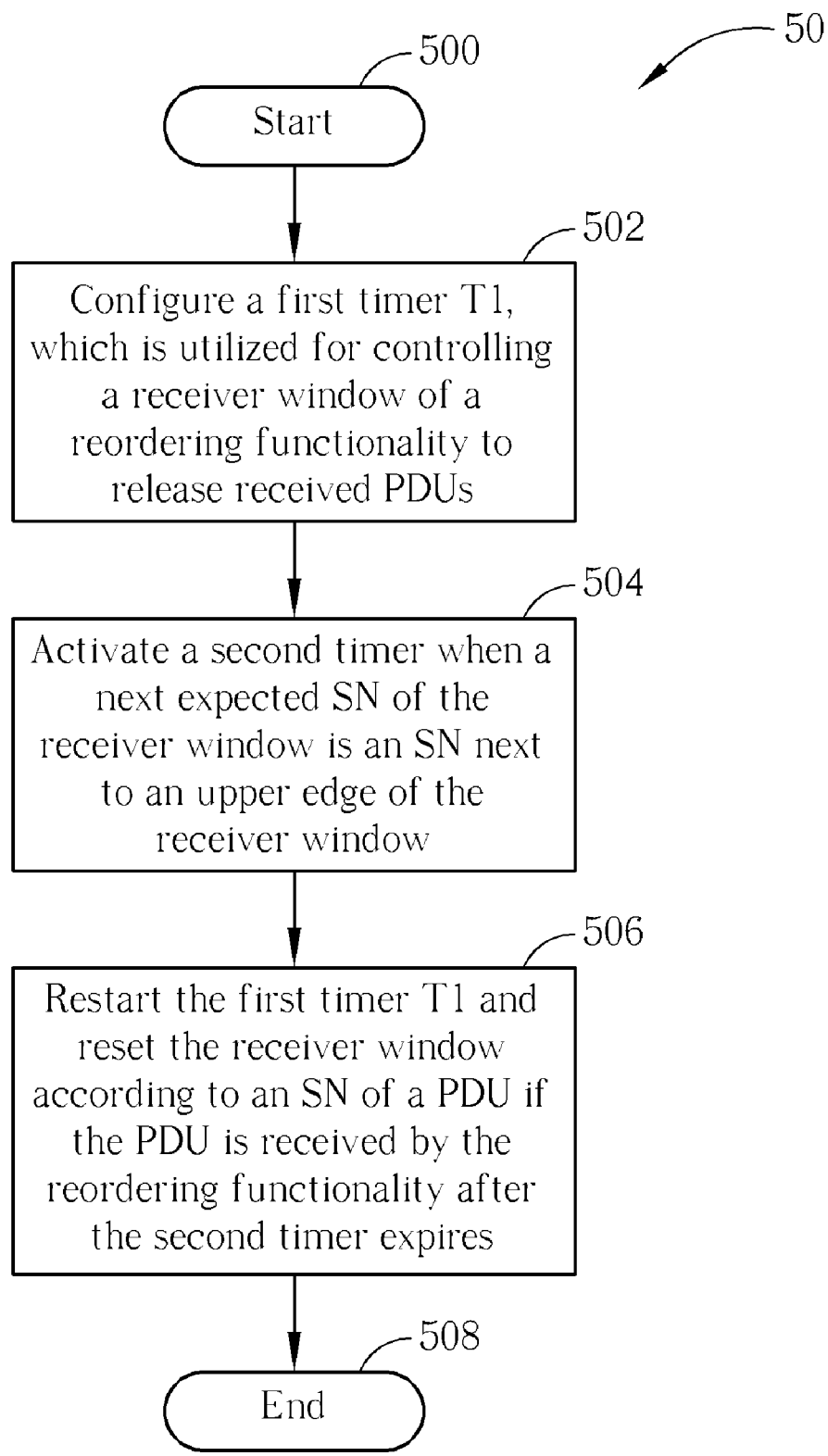
FIG. 7 is a flow chart of a process according to a third embodiment of the present invention.

Similarly, Please refer to FIG. 6. FIG. 6 illustrates a schematic diagram of a process 50 according to a third embodiment of the present invention. The process 50 is utilized for improving a reordering functionality in a user equipment of a wireless communications system, and can be compiled into the reordering functionality reset program code 220. The process 50 includes the following steps:

Step 500: Start.

Step 502: Configure a first timer T1, which is utilized for controlling a receiver window of a reordering functionality to release received PDUs.

Step 504: Activate a second timer when a next expected SN of the receiver window is an SN next to an upper edge of the receiver window.

Step 506: Restart the first timer T1 and reset the receiver window according to an SN of a PDU if the PDU is received by the reordering functionality after the second timer expires.

Step 508: End.

According to the process 50, the second timer is activated when the next expected SN of the receiver window is an SN next to the upper edge of the receiver window. Then, if a PDU is received by the reordering functionality after the second timer expires, the first timer T1 is restarted and the receiver window is reset according to an SN of the received PDU.

Therefore, compared with the process 40, by using the second timer in the embodiment of the present invention, the receiver window of the reordering functionality can be reset according to the SN of the received PDU when the next expected SN of the receiver window is an SN next to the upper edge of the receiver window and no PDU is received for a period of time, so as to prevent the received PDUs from being discarded incorrectly. Such variations also belong to the scope of the present invention.

Figure 8:
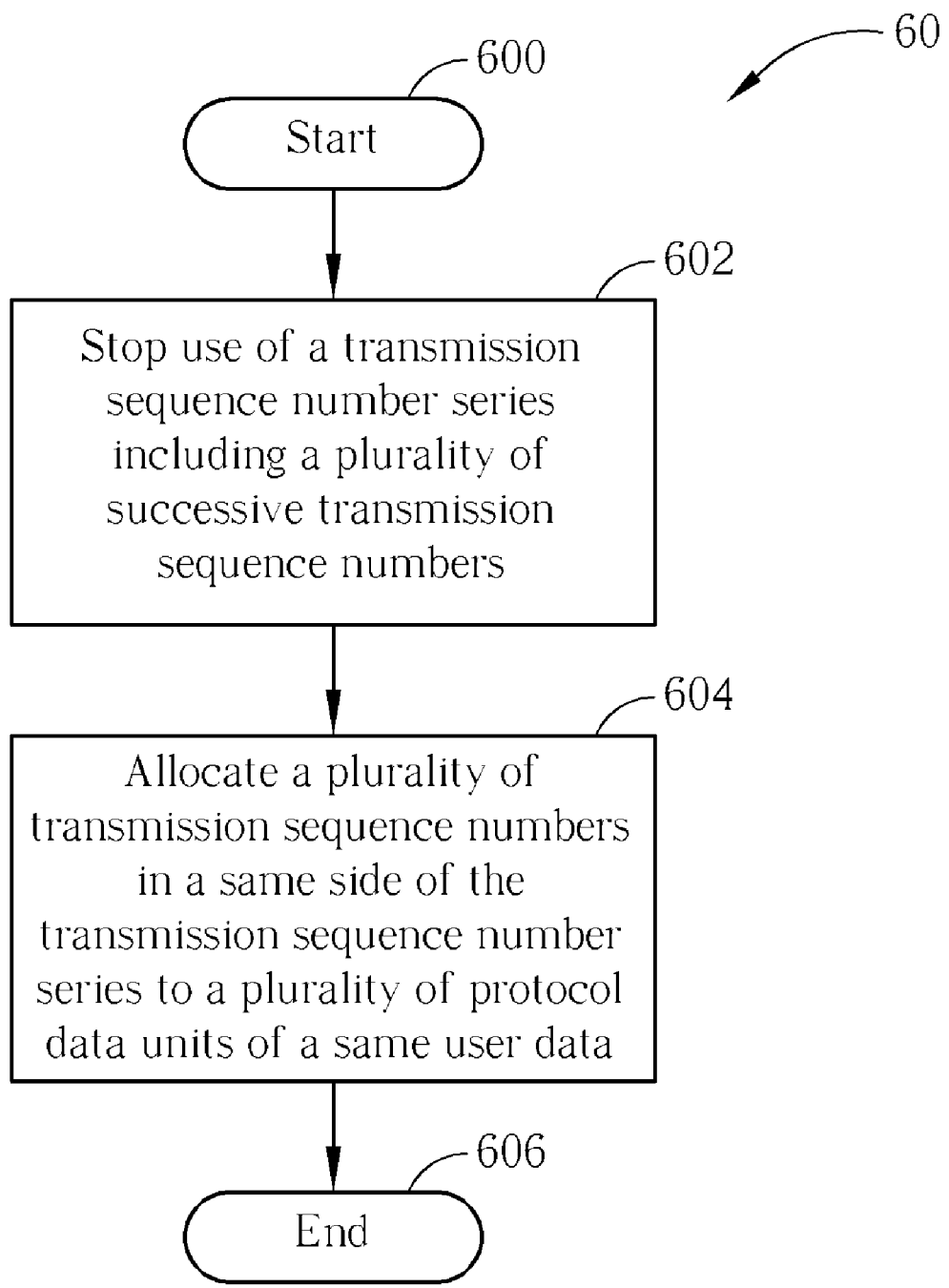
FIG. 8 is a flow chart of a process according to a forth embodiment of the present invention.

In addition, please refer to FIG. 8, which illustrates a schematic diagram of a process 60 according to a fourth embodiment of the present invention. The process 60 is utilized for improving a reordering functionality in a network end of a wireless communications system, and can be compiled into the reordering functionality reset program code 220. The process 60 includes the following steps:

Step 600: Start.

Step 602: Stop use of a transmission sequence number series including a plurality of successive transmission sequence numbers.

Step 604: Allocate a plurality of transmission sequence numbers in a same side of the transmission sequence number series to a plurality of protocol data units of a same user data.

Step 606: End.

According to the process 60, a transmission sequence number series is configured not to be used for transmission before the network end transmits the user data. The transmission sequence number series includes a plurality of successive transmission sequence numbers, and is corresponding to an initial range of a receiver window of the UE reordering functionality defined in the wireless communications system. Then, when the network allocates transmission sequence numbers, a plurality of transmission sequence numbers in a same side of the transmission sequence number series shall be allocated to a plurality of PDUs of a same user data in the embodiment of the present invention.

Therefore, by stopping the use of the transmission sequence number series in the network end, the situation that received PDUs may be wrongly discarded when the reordering functionality of the UE is reset or initiated can be avoided, so that ways to configuring the reordering functionality of the UE can be kept unchanged. In addition, for the received PDUs of the UE being able to be delivered properly, the transmission sequence numbers in the same side of the transmission sequence number series are preferably to be allocated to a plurality of PDUs of the same user data, such as a radio Resource Control (RRC) message or a complete upper layer Service Data Unit (SDU) intended for a UE.

Note that the reordering functionality mentioned above is not restricted to that in MAC-ehs protocol entity, any protocol entity having the reordering functionality, such as a Radio Link Control (RLC) protocol entity, also belongs to the scope of the present invention.

As mentioned above, the embodiments of present invention provides a method and apparatus for improving the reordering functionality in a wireless communications system to enhance data transmission efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving a reordering functionality in a user equipment of a wireless communications system, the method comprising:
configuring a reset timer, the reset timer controlling a reset of a reordering functionality in a protocol entity;
reassembling all received protocol data units with previously stored protocol data unit segments in the protocol entity when the reset of the reordering functionality is required by expiry of the reset timer; and
discarding all protocol data unit segments stored in the protocol entity when the reset timer expires.

2. The method of claim 1, wherein the reset timer is used when the user equipment is in a CELL FACH state.

3. The method of claim 1, wherein reassembling the received protocol data units with the previously stored protocol data unit segments in the protocol entity further comprises delivering complete upper layer protocol data units of the received protocol data units to an upper layer protocol entity of the protocol entity.

4. The method of claim 1 further comprising delivering complete upper layer protocol data units successfully reassembled to an upper layer protocol entity of the protocol entity.

5. The method of claim 1, wherein the protocol entity is a MAC-ehs protocol entity.

6. A communications device for improving a reordering functionality in a wireless communications system, the communications device comprising:
a control circuit for realizing functions of the communications device;
a processor installed in the control circuit, for executing a program code to command the control circuit; and
a memory installed in the control circuit and coupled to the processor for storing the program code;
wherein the program code comprises:
configuring a reset timer, the reset timer controlling a reset of reordering functionality in a protocol entity;
reassembling all received protocol data units with previously stored protocol data unit segments in the protocol entity when the reset of the reordering functionality is required by expiry of the reset timer; and
discarding all protocol data unit segments stored in the protocol entity when the reset timer expires.

7. The communications device of claim 6, wherein the reset timer is used when the communications device is operated in a CELL FACH state.

8. The communications device of claim 6, wherein reassembling the received protocol data units with the previously stored protocol data unit segments in the protocol entity further comprises delivering complete upper layer protocol data units of the received protocol data units to an upper layer protocol entity of the protocol entity.

9. The communications device of claim 6, wherein the program code further comprises delivering complete upper layer protocol data units successfully reassembled to an upper layer protocol entity of the protocol entity.

10. The communications device of claim 6, wherein the protocol entity is a MAC-ehs protocol entity.

11. A method for improving a reordering functionality in a user equipment of a wireless communications system, the method comprising:
configuring a first timer, the first timer controlling a receiver window of a reordering functionality to release received protocol data units;
activating a second timer when a next expected transmission sequence number of the receiver window is a transmission sequence number next to an upper edge of the receiver window; and
restarting the first timer and resetting the receiver window according to a transmission sequence number of a protocol data unit if the protocol data unit is received by the reordering functionality after the second timer expires.

12. The method of claim 11, wherein the second timer is the first timer.

13. The method of claim 11, wherein resetting the receiver window according to the transmission sequence number of the protocol data unit further comprises: setting the upper edge of the receiver window to be the transmission sequence number of the protocol data unit; and setting the next expected transmission sequence number of the receiver window to be a lower edge of the receiver window.

14. A communications device for improving a reordering functionality in a wireless communications system, the communications device comprising:
a control circuit for realizing functions of the communications device;
a processor installed in the control circuit, for executing a program code to command the control circuit; and
a memory installed in the control circuit and coupled to the processor for storing the program code;
wherein the program code comprises:
configuring a first timer, the first timer controlling a receiver window of a reordering functionality to release received protocol data units;
activating a second timer when a next expected transmission sequence number of the receiver window is a transmission sequence number next to an upper edge of the receiver window; and
restarting the first timer and resetting the receiver window according to a transmission sequence number of a protocol data unit if the protocol data unit is received by the reordering functionality after the second timer expires.

15. The communications device of claim 14, wherein the second timer is the first timer.

16. The communications device of claim 14, wherein resetting the receiver window according to the transmission sequence number of the protocol data unit further comprises:
setting the upper edge of the receiver window to be the transmission sequence number of the protocol data unit; and setting the next expected transmission sequence number of the receiver window to be a lower edge of the receiver window.

17. A method for improving a reordering functionality in a network end of a wireless communications system, the method comprising:
   stopping use of a transmission sequence number series, the transmission sequence number series comprising a plurality of successive transmission sequence numbers; and
   allocating a plurality of transmission sequence numbers in a same side of the transmission sequence number series to a plurality of protocol data units of a same user data.

18. The method of claim 17, wherein the user data is a radio resource control message intended for a user equipment.

19. The method of claim 17, wherein the user data is a complete upper layer service data unit intended for a user equipment.

20. The method of claim 17, wherein the transmission sequence number series corresponds to an initial range of a receiver window of the reordering functionality defined in the wireless communications system.

21. A communications device for improving a reordering functionality in a wireless communications system, the communications device comprising:
   a control circuit for realizing functions of the communications device;
   a processor installed in the control circuit, for executing a program code to command the control circuit; and
   a memory installed in the control circuit and coupled to the processor for storing the program code;
   wherein the program code comprises:
      stopping use of a transmission sequence number series, the transmission sequence number series comprising a plurality of successive transmission sequence numbers; and
      allocating a plurality of transmission sequence numbers in a same side of the transmission sequence number series to a plurality of protocol data units of a same user data.

22. The communications device of claim 21, wherein the user data is a radio resource control message intended for a user equipment.

23. The communications device of claim 21, wherein the user data is a complete upper layer service data unit intended for a user equipment.

24. The communications device of claim 21, wherein the transmission sequence number series corresponds to an initial range of a receiver window of the reordering functionality defined in the wireless communications system.

* * * * *